United States Patent
Ikeda et al.

(10) Patent No.: US 8,428,557 B2
(45) Date of Patent: Apr. 23, 2013

(54) ELECTRONIC DEVICE, AND ELECTRONIC DEVICE OPERATIONAL LOCK DEACTIVATION METHOD

(75) Inventors: Shogo Ikeda, Ome (JP); Yuki Kanbe, Ome (JP)

(73) Assignee: Kabushiki Kaisha TOshiba, Tokyo (JP)

( * ) Notice: Subject to any disclaimer, the term of this patent is extended or adjusted under 35 U.S.C. 154(b) by 37 days.

(21) Appl. No.: 13/216,975

(22) Filed: Aug. 24, 2011

(65) Prior Publication Data
US 2012/0157048 A1    Jun. 21, 2012

(30) Foreign Application Priority Data
Dec. 16, 2010 (JP) ................................ 2010-280956

(51) Int. Cl.
*H04W 12/00* (2009.01)
(52) U.S. Cl.
USPC .......................... 455/411; 455/456.1; 455/457
(58) Field of Classification Search .................. 455/411, 455/456.1, 457, 550.1, 9
See application file for complete search history.

(56) References Cited

U.S. PATENT DOCUMENTS

| 7,606,578 | B2 * | 10/2009 | Irvin et al. | ................. 455/456.1 |
| 2011/0061006 | A1 * | 3/2011 | Song et al. | ................. 715/760 |

FOREIGN PATENT DOCUMENTS

| JP | 11-186955 | 7/1999 |
| JP | 2001-224064 | 8/2001 |
| JP | 2003-259445 | 9/2003 |
| JP | 2006-303747 | 11/2006 |
| JP | 2007-168533 | 7/2007 |
| JP | 2008-306548 | 12/2008 |
| JP | 2009-211466 | 9/2009 |

OTHER PUBLICATIONS

Japanese Patent Application No. 2010-280956, Notification of Reasons for Refusal, mailed Dec. 20, 2011, (English Translation).
Japanese Patent Application No. 2010-280956, Notification of Reasons for Refusal, drafted Mar. 5, 2012, (English Translation).

* cited by examiner

*Primary Examiner* — Cong Tran
(74) *Attorney, Agent, or Firm* — Blakely, Sokoloff, Taylor & Zafman LLP

(57) ABSTRACT

In one embodiment, there is provided an electronic device. The device includes: a lock controller configured to lock control of the electronic device so that a specific operation cannot be performed on the electronic device; a lock deactivation region registration module configured to register a region where the operation lock should be deactivated if the electronic device has been locked; a location detector configured to detect a location of the electronic device; and an operational lock deactivation module configured to compare the detected location of the device against the registered region where the operation lock should be deactivated, and configured to deactivate the operational lock of the electronic device when the electronic device is located within the registered region where the operation lock should be deactivated.

6 Claims, 9 Drawing Sheets

FIG. 6

| ELECTRONIC DEVICE CURRENT LOCATION | NUMBER OF OCCA-SIONS DETECTED |
|---|---|
| OUME CITY, TOKYO | 300 |
| MINATO DISTRICT, TOKYO | 110 |
| AKISHIMA CITY, TOKYO | 21 |
| MACHIDA CITY, TOKYO | 2 |
| OTHER | 1 |

LOCATION DETECTION TABLE: DETECT POSITION EVERY HOUR, AND STORE IN TABLE

FIG. 8
(a)
LOCK DEACTIVATED
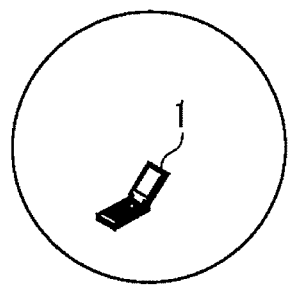
OUME CITY
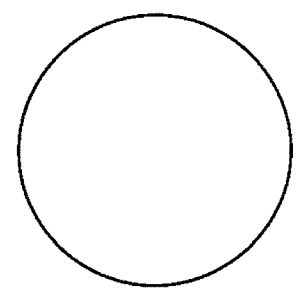
MINATO DISTRICT
(b)
LOCKED
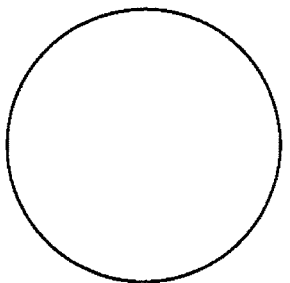
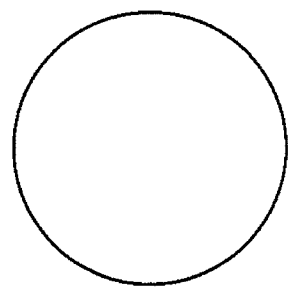
OUME CITY
MINATO DISTRICT

ELECTRONIC DEVICE, AND ELECTRONIC DEVICE OPERATIONAL LOCK DEACTIVATION METHOD

CROSS-REFERENCE TO RELATED APPLICATIONS

This application is based upon and claims the benefit of priority from Japanese Patent Application No. 2010-280956, filed Dec. 16, 2010, the entire contents of which are incorporated herein by reference.

BACKGROUND

1. Field

Embodiments described herein relate to an electronic device in which a specific user operation is locked, and an electronic device operational lock deactivation method.

2. Description of the Related Art

Electronic devices such as mobile phones and smartphones are now widespread.
Some of these electronic devices can be locked (referred to below as operational locked) in order to prevent a specific operation or a specific function of the electronic device being executed by someone else if a user, for example, loses the electronic device or has it stolen.

The lock on execution of a specific operation or function in such electronic devices is in many cases by, for example, making a user enter a Personal Identification Number (PIN, serving as a password), with the operational lock of the electronic device being deactivated by re-entering the correct PIN (password). Such a configuration enables prevention of execution of a specific operation or specific function on the electronic device by someone else.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention:

FIG. 6 is a diagram showing an example of a table for storing acquired electronic device location data with an electronic device of an exemplary embodiment;

FIGS. 8A and 8B are explanatory diagrams of how operational lock deactivation and operational locking is performed during use of an electronic device of an exemplary embodiment.

DETAILED DESCRIPTION

According to exemplary embodiments of the present invention, there is provided an electronic device. The device includes: a lock controller configured to lock control of the electronic device so that a specific operation cannot be performed on the electronic device; a lock deactivation region registration module configured to register a region where the operation lock should be deactivated if the electronic device has been locked; a location detector configured to detect a location of the electronic device; and an operational lock deactivation module configured to compare the detected location of the device against the registered region where the operation lock should be deactivated, and configured to deactivate the operational lock of the electronic device when the electronic device is located within the registered region where the operation lock should be deactivated.

An explanation follows regarding an exemplary embodiment with reference to the drawings.

Figure 1:
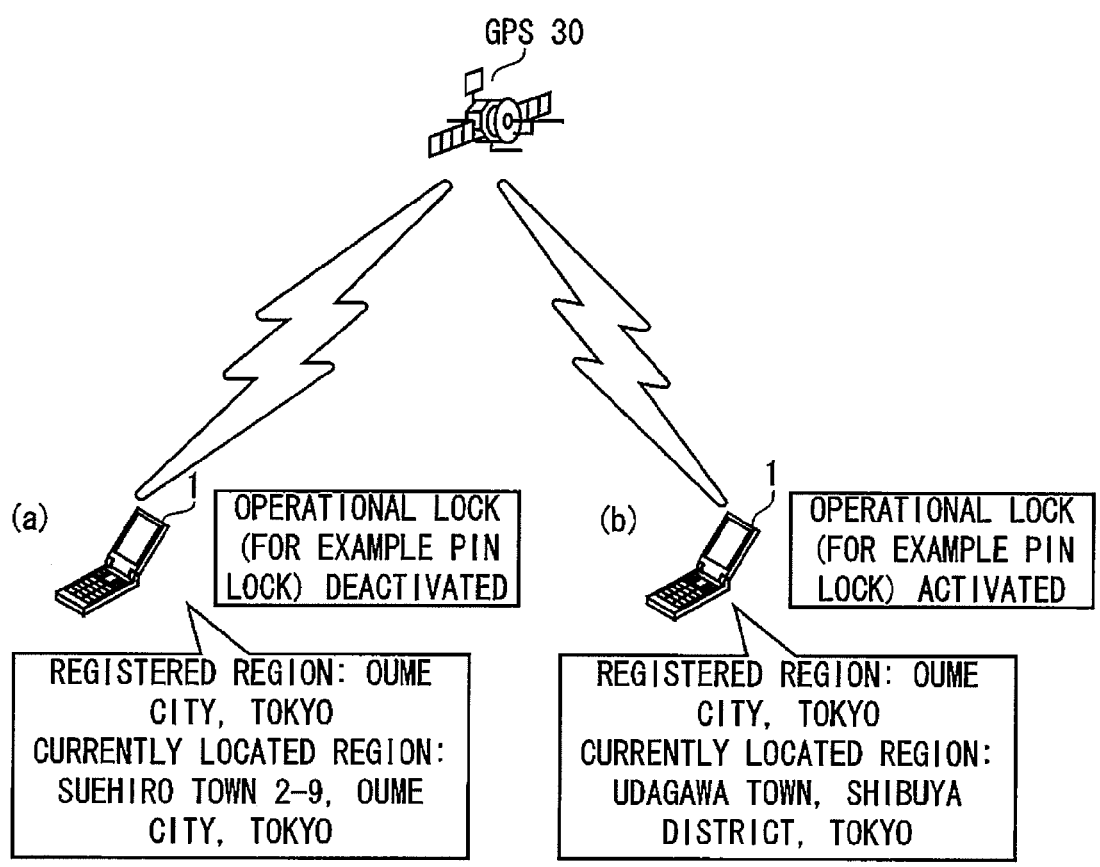
FIG. 1 is a figure illustrating a system employing an electronic device of an exemplary embodiment.

FIG. 1 is a diagram showing an example of a system in which an electronic device according to the exemplary embodiment is used.

While this explanation uses a mobile phone as an example of an electronic device, the exemplary embodiment is also applicable to other electronic devices, such as a smartphone, a tablet device, a personal computer (PC) and a personal digital assistant (PDA).

FIG. 1 illustrates an electronic device (mobile phone) 1 and a GPS satellite 30. A Global Positioning System (GPS) is used as a system in the present exemplary embodiment.

The electronic devices 1 receive a GPS signal from the GPS satellite 30, and determine its current location in the world. The electronic device 1 in the present exemplary embodiment is normally locked from operation in order to prevent operation or execution of a function by someone else. Operational locking is accomplished by setting a PIN (password).

FIG. 1 illustrates how the operational lock is deactivated when the electronic device 1 at FIG. 1 (a) is located in an operational lock deactivation region where a pre-registered operation lock is deactivated.

"Oume City, Tokyo" is pre-registered as the operational lock deactivation region in this case. The current location is determined by the GPS system to be "Suchiro Town 2-9, Oume City, Tokyo".

The electronic device 1 then compares the pre-registered "Oume City, Tokyo" against the determined location of "Suchiro Town 2-9, Oume City, Tokyo", ascertains that the device (electronic device 1) is in its operational lock deactivation region, and deactivates the operation lock of the device (electronic device 1).

FIG. 1 illustrates how the operation lock is not deactivated when the electronic device 1 is located at (b) in FIG. 1, not in its pre-registered operational lock deactivation region.

This electronic device 1 at location (b) also has "Oume City, Tokyo" pre-registered as its operational lock deactivation region. The current location is similarly determined by the GPS system, and in this case is "Udagawa Town, Shibuya District, Tokyo".

This electronic device 1 then compares the pre-registered "Oume City, Tokyo" against the determined current location "Udagawa Town, Shibuya District, Tokyo", ascertains that the device (electronic device 1) is not within its operational lock deactivation region, and so does not deactivate the operational lock on the device (electronic device 1).

Figure 2:
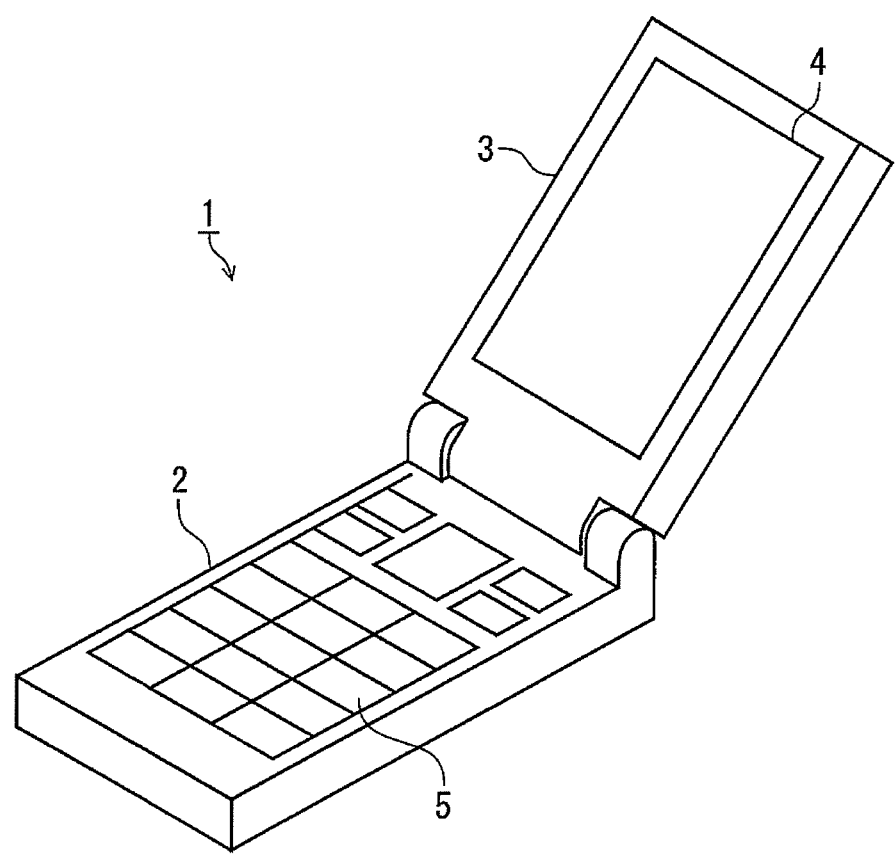
FIG. 2 illustrates an example of an external appearance of the electronic device of an exemplary embodiment.

FIG. 2 illustrates an example of the external appearance of the electronic device according to the present exemplary embodiment.

As above the electronic device 1 of the exemplary embodiment is a mobile phone. The device (electronic device 1) includes a main body 2, a display 3 for displaying pictures on the electronic device (mobile phone) 1, and operation keys 5.

Figure 3:
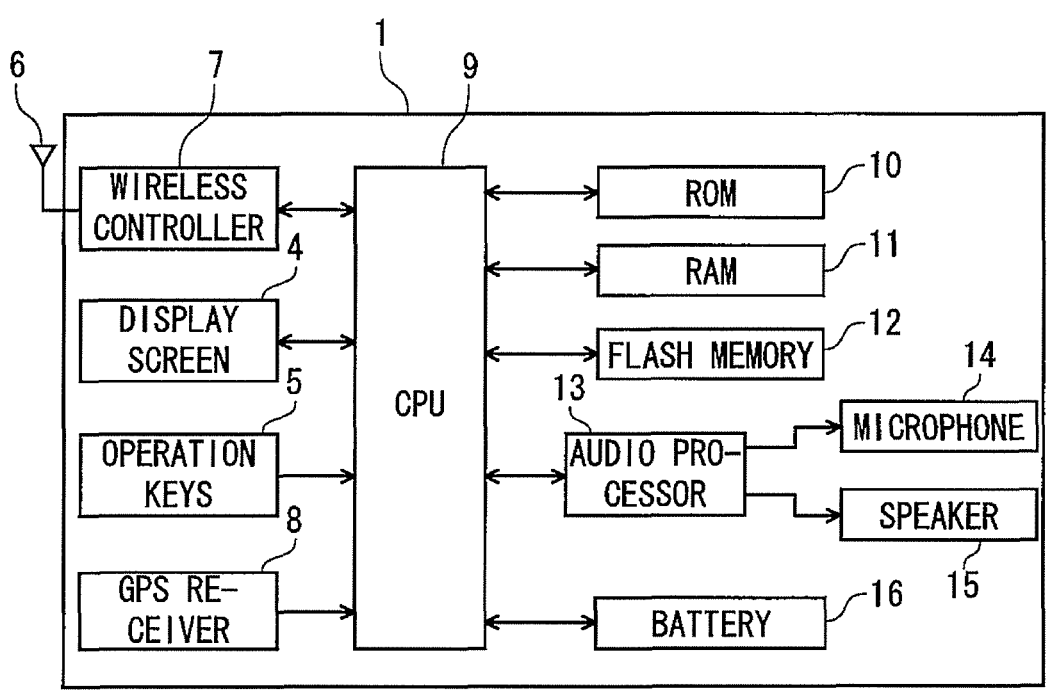
FIG. 3 is a block diagram showing an example of a configuration of an electronic device according to an exemplary embodiment.

FIG. 3 is a block diagram illustrating an example of a configuration of the electronic device of an exemplary embodiment.

The electronic device (mobile phone) 1 includes: an antenna 6 for receiving a telephone signal; a wireless controller 7 for controlling the received telephone signal; a GPS receiver 8 for receiving the GPS signal; a CPU 9 for controlling the electronic device (mobile phone) 1; ROM 10 employed for example during processing by the CPU 9; RAM 11 employed for example during processing by the CPU 9; flash memory 12 employed for example during processing by the CPU 9; an audio processor 13 for audio processing, such as for voice calls; a microphone 14 for picking up the voice of a user, for example; a speaker 15 for sound output; and a battery 16 for supplying power to the electronic device (mobile phone) 1.

Figure 4:
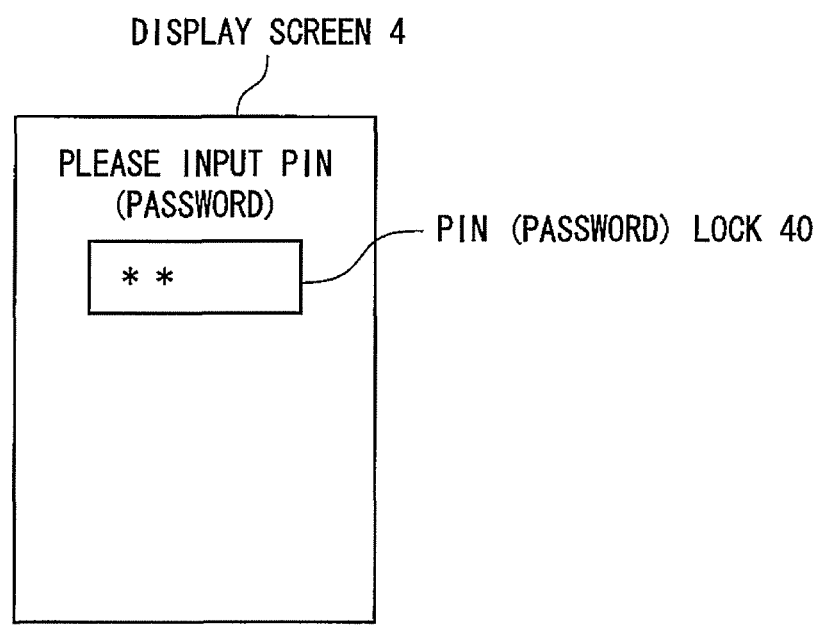
FIG. 4 is diagram showing an example of an input screen for a user to enter a PIN (password) in order to deactivate a PIN (password) lock in an electronic device of an exemplary embodiment.

The CPU 9 controls the electronic device 1 overall. FIG. 4 illustrates an example of a PIN (password) input screen for a user to deactivate the PIN (password) lock in the electronic device of the exemplary embodiment. In the electronic device 1 of the present exemplary embodiment, in order to prevent operation or execution of a function of the electronic device by someone else, normally an operational lock (PIN (password) lock) is executed by setting a PIN (password), and by deactivating the lock when the PIN (password) has been entered.

Such a screen is displayed to a user for entering the PIN (password) when, for example as illustrated at (b) in FIG. 1, the electronic device 1 is not within its operational lock deactivation region and the operational lock has not been deactivated.

This particular display screen 4 displays "Please input PIN (password)" and is linked to a PIN (password) lock 40.

Figure 5:
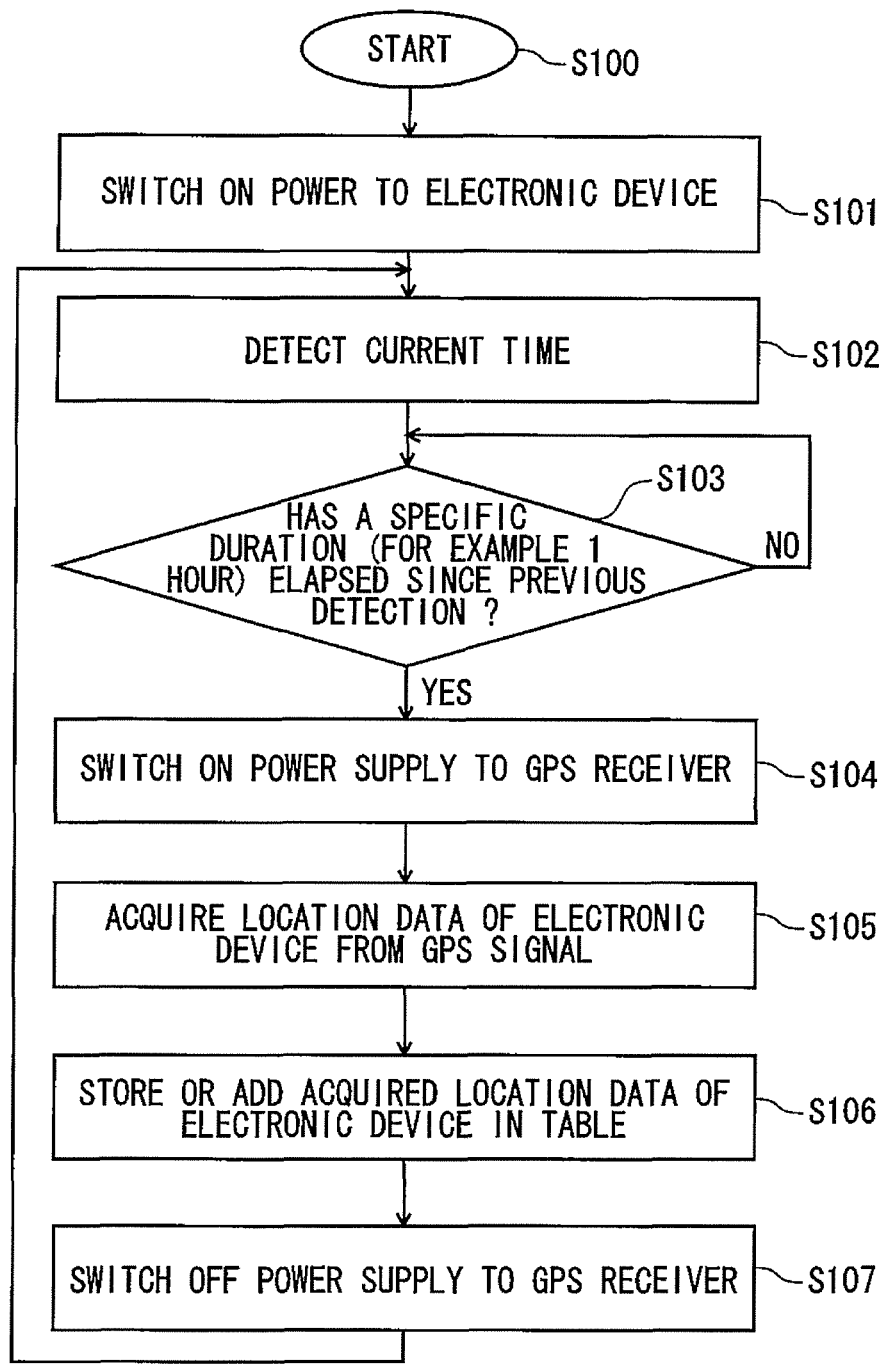
FIG. 5 is a flow chart for explaining an example of a method for acquiring location data of an electronic device with an electronic device of an exemplary embodiment.

FIG. 5 is a flow chart for explaining an example of a method for acquiring location data for the electronic device according to the present exemplary embodiment. Processing is started at step S100 and then proceeds to step S101. The power to the electronic device 1 is switched ON in step S101. Processing then proceeds to step S102. The current time is detected at step S102. Processing then proceeds to step S103. Determination is made at step S103 as to whether or not a specific duration (for example 1 hour) has elapsed since previous detection. Processing then proceeds to step S104 when the specific duration (for example 1 hour) has elapsed (Yes). The processing of step S103 is repeated when the specific duration has not yet elapsed.

Power supply to the GPS receiver 8 is switched ON in step S104. Processing then proceeds to Step 105. Location data is acquired from the GPS signal at step S105. Processing then proceeds to step S106. At step S106, the acquired location data of the electronic device is then stored or added in a table, described later. Processing then proceeds to step S107. Power supply to the GPS receiver 8 is switched OFF at step S107. Processing then returns to step S102 and the above processing is repeated. FIG. 6 illustrates an example of a table for storing acquired location data for the electronic device according to the electronic device of an exemplary embodiment. In the present exemplary embodiment, such a table is stored, for example, on the ROM 10. In the above embodiment, the electronic device 1 location detection is made for example every hour. Then, for example, each time of location detection for the electronic device 1 is counted as one detection occasion. In the example illustrated, the electronic device location region, which is the region where the electronic device is located, the detections are made at specific intervals of time as follows: "Oume City, Tokyo" on 300 occasions; "Minato District, Tokyo" on 110 occasions; "Akishima City, Tokyo" on 21 occasions; "Machida City; Tokyo" on 2 occasions; and "Other" on 1 occasion.

Figure 7:
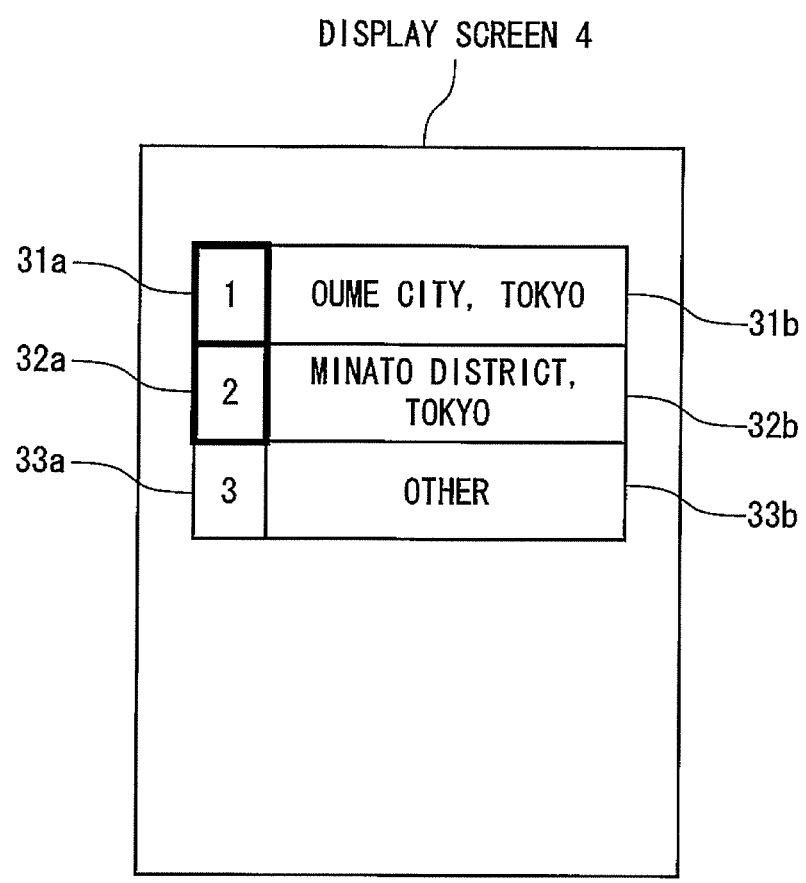
FIG. 7 is a diagram of an example of an operational lock deactivation region registration screen for display when registering a region for operational lock deactivation, in an electronic device of an exemplary embodiment.

The electronic device location region is stored for example in District, and City, Town, Village units, however the area covered by each unit may be appropriately changed as required. This table is employed, for example, to display the operational lock deactivation region registration screen as explained below. FIG. 7 is diagram illustrating an example of an operational lock deactivation region registration screen for display when a user is registering a region where the operational lock is to be deactivated. In the current example, the CPU 9 employs the table stored in the ROM 10 to display the operational lock deactivation region registration screen on the display screen 4. Two regions with the greatest number of detection occasions are displayed in order of frequency so to prompt user selection. In FIG. 7, the First Reference No. 31*a* is "Oume City, Tokyo" 31*b*, the Second Reference No. 32*a* is "Minato District, Tokyo", and the Third Reference No. 33*a* is "Other" 33*b*.

For example, since this particular electronic device user often uses the electronic device 1 in "Oume City, Tokyo" and "Minato District, Tokyo", these regions are selected and registered as operational lock deactivation regions. The First Reference No. 31*a* and the Second Reference No. 32*a* are highlighted to stand out from the other regions for designation by a user.

In the present exemplary embodiment the desired operational lock deactivation region may also be directly input by a user to the electronic device 1.

FIG. 8A and FIG. 8B are diagrams to explain operational lock deactivation and operational locking, respectively, when the electronic device of the exemplary embodiment is being used. In the current example "Oume City, Tokyo" and "Minato District, Tokyo" are registered as operational lock deactivation regions.

FIG. 8A illustrates a state in which operational lock is deactivated.

Namely, since the illustrated electronic device 1 is determined to be located in "Oume City, Tokyo", which is one of the operational lock deactivation regions designated as above, the operational lock is deactivated.

FIG. 8B illustrates a state in which the operational lock has not been deactivated. Namely, since the illustrated electronic device 1 is determined not to be located in either of the registered operational lock deactivation regions, "Oume City, Tokyo" or "Minato District, Tokyo", user operational lock is not deactivated and remains locked.

Figure 9:
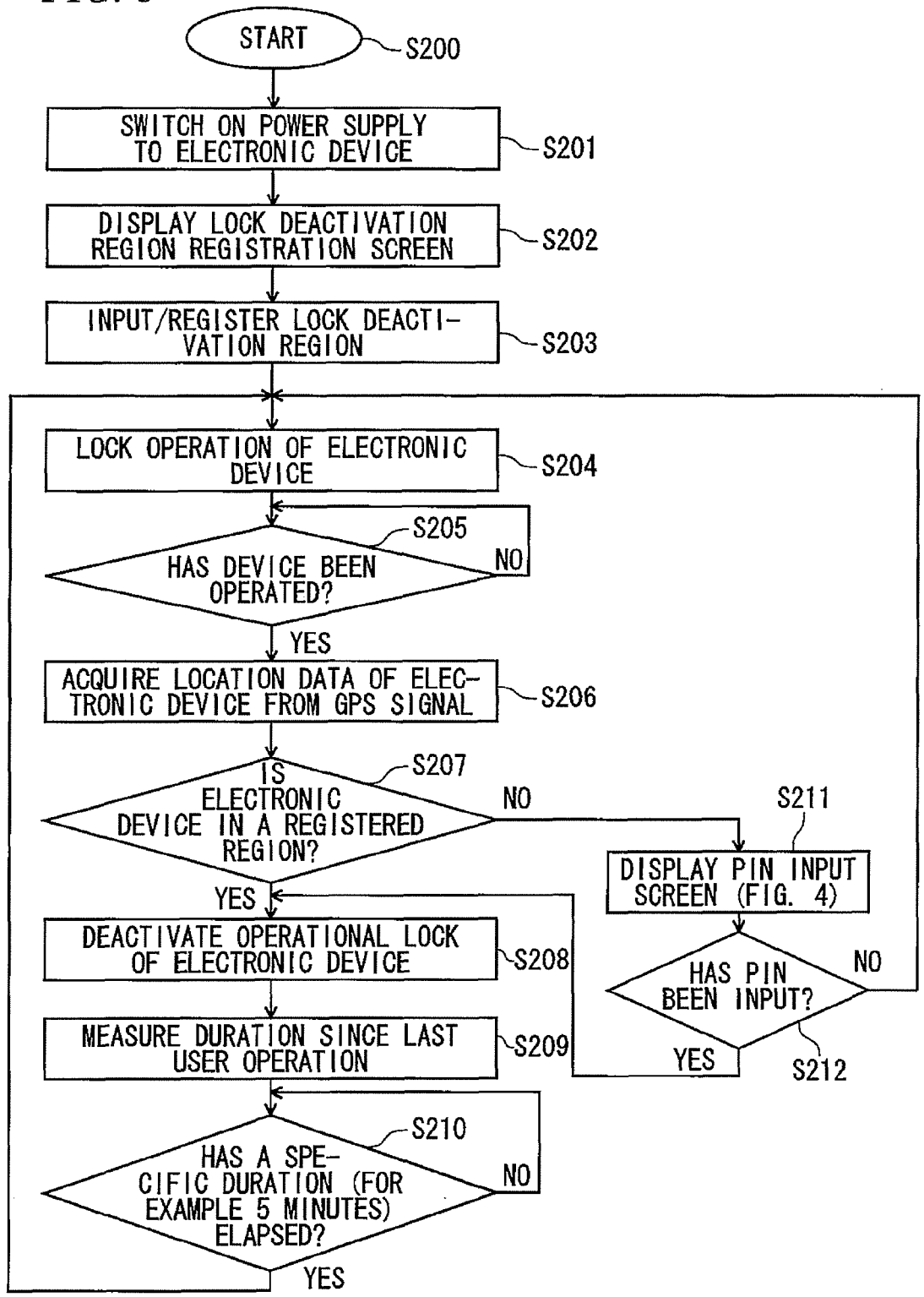
FIG. 9 is a flow chart for explaining an example of operation of the electronic device according to an exemplary embodiment.

FIG. 9 is a flow chart for explaining an example of operation of the electronic device of the present exemplary embodiment. Processing starts at S200. Processing then proceeds to step S201. Power to the electronic device 1 is switched ON at step S201. Processing then proceeds to step S202. At step S202, an operational lock deactivation region registration screen like the one shown in FIG. 7 is displayed. Processing then proceeds to step S203. At step S203, a user operates the operation keys 5 of the electronic device 1, selects and registers the operational lock deactivation region(s), for example in the flash memory 12 of the electronic device 1. Processing then proceeds to step S204.

The electronic device 1 is operationally locked at step S204. Processing then proceeds to step S205.

Determination is made at step S205 as to whether or not the electronic device 1 has been operated by, for example, detecting whether the operation keys 5 of the electronic device 1 have been operated. Processing proceeds to step S206 when it is determined that the electronic device 1 has been operated (Yes). However, when it is determined that the electronic device 1 has not been operated then the processing is repeated (No).

At step S206, the current location of the electronic device 1, namely location data, is captured from the signal output from the GPS satellite 30. Processing then proceeds to step S207.

At step 207 the region in which the device (electronic device 1) is located is compared against the registered operational lock deactivation region(s), to determine whether the device (electronic device 1) is within a region registered as an operational lock deactivation region. Processing proceeds to step S208 when it is determined that the device (electronic device 1) is within a region registered as an operational lock deactivation region (Yes). However, when it is determined that the device (electronic device 1) is not in a region registered as an operational lock deactivation region then processing proceeds to step S211 (No).

The operational locking of the electronic device 1 is deactivated in step S208. Processing then proceeds to step S209. The duration of non-operation of the electronic device 1 by the user is measured in step S209. Processing then proceeds to step S210.

Determination is made at step 210 as to whether or not the elapsed above measured duration of non-operation by a user is a specific duration or greater (for example 5 minutes). Processing returns to step S204 when the user non-operation duration elapsed surpasses the specific duration (for example 5 minutes). However, when the user non-operation duration elapsed is determined to be less than the specific duration (for example 5 minutes) the processing of step 210 is repeated (No).

A PIN input screen (such as for example FIG. 4) is displayed at step 211. Processing then proceeds to step S212. Determination is made at step 212 as to whether or not a PIN has been entered by a user. When it is determined that a PIN has been entered (Yes), processing proceeds to step S208. However, when determined that a PIN has not been entered processing proceeds to step S204 (No) and the above processing is performed.

The above configuration in the present exemplary embodiment enables security to be raised while maintaining ease of use for a user.

Automatic locking is also enabled when, for example, an electronic device normally used without a locking function is susceptible to being lost or stolen.

In the present exemplary embodiment, changes are merely made at the security level, without rendering the electronic device 1 unusable. Accordingly, significant issues for the current owner of the electronic device 1 related to the use of the electronic device 1 do not arise.

The above exemplary embodiment has the advantage that no particular procedure is required to engage locking, as distinct from when remote locking is employed.

As an example of another exemplary embodiment, configuration may be made such that operational locking is performed at an even finer level of detail.

Operational locking may, for example, be performed with the unit by operational locking at the profile, e-mail/texting, address book, data folders unit levels.

Furthermore, while in the above explanation the ON/OFF control of the operational lock deactivation was performed for the device itself (electronic device 1), operational lock deactivation ON/OFF control may be applied, for example, to ON/OFF control for a manner mode deactivation for a mobile phone.

For example, a user may register their workplace as a location for switching manner mode deactivation off. Then, the manner mode might be set at home such that ring-tone is emitted (manner mode deactivation ON setting), if the user takes the phone to the workplace that has been registered as a manner mode deactivation OFF location, it would be possible to automatically set the manner mode such that no ring-tone is emitted (manner mode deactivation OFF setting).

Adopting the above configuration in embodiments described herein enables the burden on a user in order to deactivate an operational lock to be decreased when an electronic device is being operationally locked.

While certain embodiments have been described, these embodiments have been presented by way of example only, and are not intended to limit the scope of the invention. Indeed, the novel methods and systems described herein may be embodied in a variety of other forms. Furthermore, various omissions, substitutions and changes in the form of the methods and systems described herein may be made without departing from the sprit of the invention. The accompanying claims and their equivalents are intended to cover such forms or modifications as would fall within the scope and sprit of the invention.

What is claimed is:

1. An electronic device comprising:
   a lock controller configured to lock control of the electronic device so that a specific operation cannot be performed on the electronic device;
   a lock deactivation region registration module configured to register a region where an operation lock of the electronic device should be deactivated if the electronic device has been locked;
   a location detector configured to detect a location of the electronic device;
   an operational lock deactivation module configured to compare the detected location of the device against the registered region where the operation lock should be deactivated, and configured to deactivate the operational lock of the electronic device when the electronic device is located within the registered region where the operation lock should be deactivated;
   a storage, wherein the location of the electronic device is detected on a plurality of occasions, and data related to regions in which the electronic device was located on each of the occasions and the frequency of how often the electronic device was located in the respective regions is stored in the storage; and
   an outputting module configured to output a registration screen to register a region where the operational lock should be deactivated, using the data stored in the storage.

2. The device of claim 1, further comprising:
   a display configured to display a registration screen to register a region where the operational lock should be deactivated.

3. The device of claim 1, wherein a plurality of lock deactivation regions where the operational lock should be deactivated are registered.

4. The device of claim 1, wherein the location of the electronic device is detected based on a user operation of the electronic device.

5. The device of claim 1, further comprising:
a GPS receiver configured to receive GPS signals for detecting the location of the electronic device.

6. A method of deactivating an operational lock for an electronic device, the method comprising:
  (a) locking control of the electronic device so that a specific operation cannot be performed on the electronic device;
  (b) registering a region where the operational lock should be deactivated if the electronic device has been locked;
  (c) detecting a location of the electronic device;
  (d) comparing the detected location of the electronic device against the registered region where the operation lock should be deactivated;
  (e) deactivating the operational lock of the electronic device if the electronic device is located within the registered region where the operation lock should be deactivated; and
  (f) detecting the location of the electronic device on a plurality of occasions;
  (g) storing data related to regions in which the electronic device was located on each of the occasions and the frequency of how often the electronic device was located in the respective regions; and
  (h) outputting a registration screen to register a region where the operational lock should be deactivated, using the data related to regions in which the electronic device was located on each of the occasions and the frequency of how often the electronic device was located in the respective regions.

* * * * *